United States Patent
Haruta

(10) Patent No.: US 8,296,674 B2
(45) Date of Patent: Oct. 23, 2012

(54) TEXT DISPLAY APPARATUS, TEXT DISPLAY METHOD AND PROGRAM STORAGE MEDIUM

(75) Inventor: Yasuchika Haruta, Tokyo (JP)

(73) Assignee: NEC Corporation, Tokyo (JP)

( * ) Notice: Subject to any disclaimer, the term of this patent is extended or adjusted under 35 U.S.C. 154(b) by 773 days.

(21) Appl. No.: 12/379,077

(22) Filed: Feb. 12, 2009

(65) Prior Publication Data

US 2009/0222423 A1    Sep. 3, 2009

(30) Foreign Application Priority Data

Feb. 29, 2008 (JP) .................................. 2008-049856

(51) Int. Cl.
*G06F 3/048* (2006.01)
(52) U.S. Cl. ......... 715/786; 715/784; 715/785; 715/787
(58) Field of Classification Search .................. 715/784, 715/785, 786, 787
See application file for complete search history.

(56) References Cited

U.S. PATENT DOCUMENTS

| | | | | |
|---|---|---|---|---|
| 5,426,648 A | * | 6/1995 | Simamura | 714/38.1 |
| 5,446,838 A | * | 8/1995 | Kimelman | 715/764 |
| 5,960,448 A | * | 9/1999 | Reichek et al. | 715/236 |
| 6,055,538 A | * | 4/2000 | Kessenich et al. | 1/1 |
| 6,091,896 A | * | 7/2000 | Curreri et al. | 717/125 |
| 6,204,846 B1 | * | 3/2001 | Little et al. | 715/784 |
| 6,658,649 B1 | * | 12/2003 | Bates et al. | 717/124 |
| 7,228,492 B1 | * | 6/2007 | Graham | 715/234 |
| 2005/0198026 A1 | * | 9/2005 | Dehlinger et al. | 707/5 |
| 2007/0260613 A1 | * | 11/2007 | Ippili et al. | 707/100 |
| 2008/0134033 A1 | * | 6/2008 | Burns et al. | 715/705 |
| 2008/0276226 A1 | * | 11/2008 | Farchi et al. | 717/129 |

FOREIGN PATENT DOCUMENTS

JP    10-269233    10/1998

* cited by examiner

*Primary Examiner* — Omar Abdul-Ali
*Assistant Examiner* — Anil Bhargava
(74) *Attorney, Agent, or Firm* — Foley & Lardner LLP

(57) ABSTRACT

A scroll bar area is displayed as two divided areas, namely a first mark display area which displays a mark figure corresponding to a first mark, and a second mark display area which displays a mark figure corresponding to a second mark. A first mark figure is displayed in that area in the first mark display area which corresponds to a line which is indicated to be affixed with the first mark by mark affixing information. A second mark figure is displayed in that area in the second mark display area which corresponds to a line which is indicated to be affixed with the second mark by the mark affixing information.

9 Claims, 11 Drawing Sheets

FIG.3

| LINE NUMBER | MARK 1 | MARK 2 |
|---|---|---|
| 1 | 0 | 0 |
| 2 | 0 | 0 |
| 3 | 1 | 0 |
| 4 | 0 | 0 |
| 5 | 0 | 0 |
| 6 | 0 | 0 |
| 7 | 0 | 0 |
| 8 | 0 | 1 |
| 9 | 0 | 0 |
| 10 | 0 | 0 |
| 11 | 0 | 0 |
| 12 | 0 | 0 |
| 13 | 0 | 1 |
| 14 | 0 | 0 |
| 15 | 0 | 0 |
| 16 | 0 | 0 |
| 17 | 1 | 0 |
| 18 | 0 | 0 |
| 19 | 1 | 0 |
| 20 | 0 | 0 |
| . | . | . |
| . | . | . |
| . | . | . |

TEXT DISPLAY APPARATUS, TEXT DISPLAY METHOD AND PROGRAM STORAGE MEDIUM

BACKGROUND OF THE INVENTION

1. Field of the Invention

The present invention relates to a text display apparatus, and text display method which are suitable for easily notifying a user that which position in a text should be noticed, and a program storage medium for realizing the text display apparatus and method on a computer.

2. Description of the Related Art

There is a proposal on a technique of highlighting a part of a text which should be noticed. To check a highlighted portion of a text, a user moves the knob of a scroll bar adjoining an area where the text is displayed to thereby change the display range.

There is an application of such a technique, which searches for a character string from a text file based on a search condition specified by a user, and highlights the character string that matches with the search condition. For example, Unexamined Japanese Patent Application KOKAI Publication No. H10-269233 discloses a search result display method of highlighting only the character string that matches with a search condition on a scroll-bar equipped window to display a part of a character string forming a text file.

SUMMARY OF THE INVENTION

Accordingly, it is an object of the present invention to provide a text display apparatus, and text display method which are suitable for easily notifying a user that which position in a text should be noticed, and a program storage medium for realizing the text display apparatus and method on a computer.

To achieve the object, a text display apparatus according to a first aspect of the invention has a storage unit, a display unit, a movement instructing input receiving unit, and an update unit, which are configured as follows.

The storage unit stores a text having a plurality of lines, and information indicating whether one of first to Nth ($N \geq 1$) kinds of marks is affixed to each of the plurality of lines.

The display unit has a text display area displaying a part of the text, and a scroll bar area representing a range of the text from a top line thereof to a last line thereof, and in the scroll bar area displays a knob figure representing a display range of the text in the text display area, and a mark figure at a position corresponding to that line in the plurality of lines forming the text to which the mark is to be affixed.

The movement instructing input receiving unit receives a movement instructing input to move the knob figure in the scroll bar area.

The update unit updates the text to be displayed in the text display area to a text of range corresponding to a moving destination of the knob figure when the knob figure is moved in response to the received movement instructing input.

To achieve the object, a text display method according to a second aspect of the invention is executed by a text display apparatus having a storage unit, a display unit, a movement instructing input receiving unit, and an update unit, and has a display step, a movement instructing input receiving step, and an update step, which are structured as follows.

A text having a plurality of lines, and information indicating whether one of first to Nth ($N \geq 1$) kinds of marks is affixed to each of the plurality of lines are stored in the storage unit.

In the display step, the display unit displays a part of the text in a text display area, displays a range of the text from a top line thereof to a last line thereof in a scroll bar area, displays a knob figure representing a display range of the text in the text display area, and displays a mark figure at a position corresponding to that line in the plurality of lines forming the text to which the mark is to be affixed.

In the movement instructing input receiving step, the movement instructing input receiving unit receives a movement instructing input to move the knob figure in the scroll bar area.

In the update step, the update unit updates the text to be displayed in the text display area to a text of range corresponding to a moving destination of the knob figure when the knob figure is moved in response to the received movement instructing input.

To achieve the object, a program storage medium according to a third aspect of the invention allows a computer to function as a storage unit, a display unit, a movement instructing input receiving unit, and an update unit in the following manner.

The storage unit stores a text having a plurality of lines, and information indicating whether one of first to Nth ($N \geq 1$) kinds of marks is affixed to each of the plurality of lines.

The display unit has a text display area displaying a part of the text, and a scroll bar area representing a range of the text from a top line thereof to a last line thereof, and displays a knob figure representing a display range of the text in the text display area, and a mark figure at a position corresponding to that line in the plurality of lines forming the text to which the mark is to be affixed.

The movement instructing input receiving unit receives a movement instructing input to move the knob figure in the scroll bar area.

The update unit updates the text to be displayed in the text display area to a text of range corresponding to a moving destination of the knob figure when the knob figure is moved in response to the received movement instructing input.

BRIEF DESCRIPTION OF THE DRAWINGS

FIG. 3 is a diagram for explaining mark affixing information;

DETAILED DESCRIPTION OF THE PREFERRED EMBODIMENTS

Referring to the accompanying drawings, the configuration of a text display apparatus according to one embodiment of the present invention will be described below.

Figure 1:
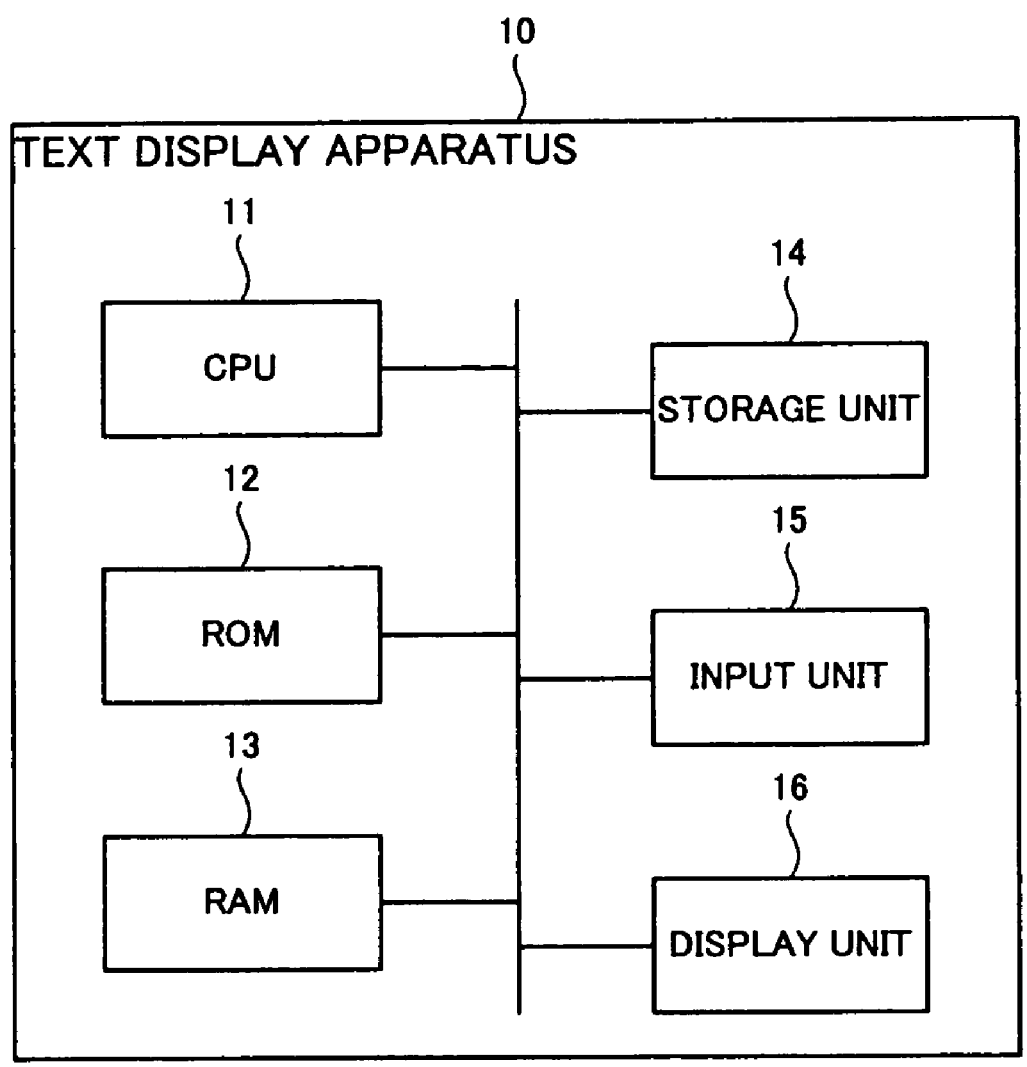
FIG. 1 is a block diagram showing the configuration of a text display apparatus according to one embodiment of the present invention.

FIG. 1 shows the configuration of a text display apparatus 10 according to one embodiment of the invention. As shown in FIG. 1, the text display apparatus 10 has a CPU (Central Processing Unit) 11, a ROM (Read Only Memory) 12, a RAM (Random Access Memory) 13, a storage unit 14, an input unit 15, and a display unit 16. The individual components of the text display apparatus 10 are connected to one another by a bus.

The CPU 11 executes processes according to a program stored in the storage unit 14. The CPU 11 controls the general operation of the text display apparatus 10, and is connected to the individual components by the bus to exchange control signals and data therewith.

The ROM 12 stores an IPL (Initial Program Loader) to be executed immediately after power ON. As the IPL is executed, the CPU 11 reads a program stored in the storage unit 14 into the RAM 13, and executes the program.

The RAM 13 temporarily stores data and a program, read from the storage unit 14.

The storage unit 14 stores the program which is executed by the CPU 11. The storage unit 14 stores a text having a plurality of lines, and information indicating whether one of first to Nth (N≧1) kinds of marks is affixed to each of the plurality of lines. The storage unit 14 comprises, for example, a hard disk.

Under the control of the CPU 11, the input unit 15 receives a screen scroll request, a character string search request, a request of executing a step (single step execution) at the time of debugging, or the like, from a user and receives input data, such as a search character string, from a user. The input unit 15 comprises, for example, a keyboard and a mouse.

Under the control of the CPU 11, the display unit 16 displays a screen for receiving various requests and data input from the user, and a screen for displaying a text stored in the storage unit 14. The display unit 16 comprises a liquid crystal display or the like.

Next, the operation of the text display apparatus 10 according to the embodiment will be described below.

First, a text display process which is executed by the text display apparatus 10 will be described referring to a flowchart shown in FIG. 2.

Upon reception of a request to start displaying a text from the user via the input unit 15, for example, the text display apparatus 10 executes the text display process.

First, the CPU 11 initializes data to be used in the text display process (step S11). Specifically, the CPU 11 initializes every mark affixing information stored in the storage unit 14 to "0". The mark affixing information is data indicating whether one of first to Nth (N≧1) kinds of marks is affixed to each line of a text formed by a plurality of lines. It is premised that the mark affixing information of "0" represents no mark being affixed, and the mark affixing information of "1" represents a mark being affixed.

When completing the initialization, the CPU 11 executes a mark affixing process (step S12). The CPU 11 sets "0" or "1" to every mark affixing information stored in the storage unit 14. Referring to FIG. 3, the mark affixing process will be described below.

FIG. 3 is a diagram exemplarily showing mark affixing information stored in the storage unit 14 when each line forming a text stored in the storage unit 14 has two kinds of attributes and two kinds of marks (hereinafter mark 1 and mark 2) are to be affixed to each line, i.e., when N=2. FIG. 3 shows an example where "1" is set to the third line, seventeenth line and nineteenth line for the mark 1, and "1" is set to the eighth line and thirteenth line for the mark 2.

The CPU 11 determines whether "1" or "0" is set as mark affixing information, based on information stored in the storage unit 14. The determination to be made by the CPU 11 based on which information differs according to the contents of an individual process (step S16) to be described later.

Figure 4:
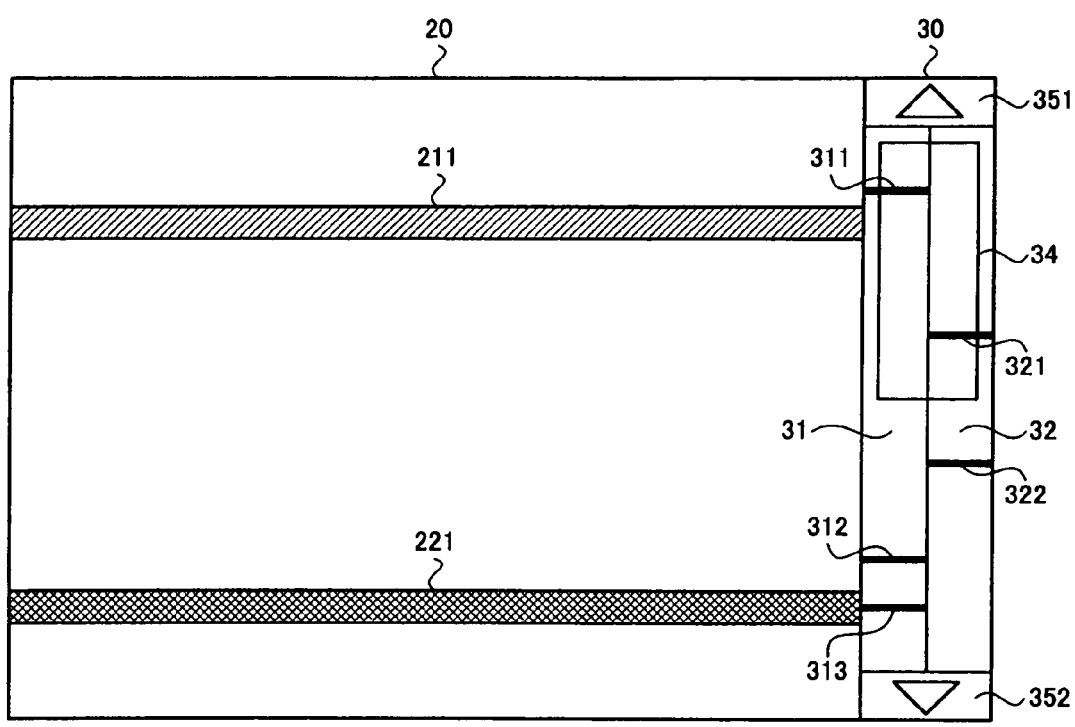
FIG. 4 is a diagram showing a screen before scrolling.

Next, the CPU 11 displays a screen on the display unit 16 (step S13). Screens to be displayed by the CPU 11 will be described in detail referring to FIG. 4. Although screens to be displayed by the CPU 11 differ slightly according to the contents of an individual process to be described later, the basic part is common. FIG. 4 shows only the basic part, and different parts will be described later.

As shown in FIG. 4, the screen to be displayed by the CPU 11 includes a text display area 20 displaying a part of a text stored in the storage unit 14, and a scroll bar area 30 representing the range of the text from the top line thereof to the last line thereof.

The scroll bar area 30 is divided into two areas along a direction in which a knob 34 moves (hereinafter "vertical direction"), specifically, a first mark display area 31 displaying a mark figure corresponding to the mark 1 and a second mark display area 32 displaying a mark figure corresponding to the mark 2. The knob 34 representing the range of a text to be displayed in the text display area 20 is placed over the first mark display area 31 and the second mark display area 32 in the scroll bar area 30. Further, an arrow 351 for moving the knob 34 upward when clicked is disposed at the upper portion of the scroll bar area 30, and an arrow 352 for moving the knob 34 downward when clicked is disposed at the lower portion of the scroll bar area 30.

The CPU 11 displays a mark figure in the scroll bar area 30 based on the mark affixing information stored in the storage unit 14. When "1" is set to the third line, seventeenth line and nineteenth line for the mark 1 as shown in FIG. 3, for example, the CPU 11 displays first mark figures 311, 312 and 313 in the first mark display area 31 at positions corresponding to the respective lines.

Likewise, when "1" is set to the eighth line and thirteenth line for the mark 2 as shown in FIG. 3, the CPU 11 displays second mark figures 321 and 322 in the second mark display area 32 at positions corresponding to the respective lines.

Further, the CPU 11 highlights a specific area in the text display area 20 based on the mark affixing information stored in the storage unit 14. When first to tenth lines in a text stored in the storage unit 14 are to be displayed in the text display area 20, for example, the third line to which mark affixing information for the first mark is set as "1" is highlighted, and the eighth line to which mark affixing information for the second mark is set as "1" is highlighted.

The highlighting mode is optional, so that the color of a text may be changed, the text may be changed to a bold type or an italic type, or the background color of the text may be changed. To clearly show that highlighting is done based on either the mark 1 or the mark 2, it is desirable to highlight the mark 1 and the mark 2 in different modes.

When the screen display (step S13) is completed, the CPU 11 receives various inputs from the user (step S14). The CPU 11 receives a screen scroll request, a character string search request, a step execution request, or an input of a character string to be searched or the like from the user via the input unit 15.

Next, the CPU 11 determines whether the user has made a screen scroll request (step S15). When having determined that the screen scroll request is received from the user (step S15: YES), the CPU 11 scrolls the screen (step S17). When having determined that the screen scroll request is not received from the user (step S15: NO), on the other hand, the CPU 11 executes an individual process (step S16).

The description of an individual process, which is executed by the CPU 11 in response to the input received from the user in the "Receive Input" process of step S14, is omitted.

In the process of step S17, the CPU 11 displays a screen with the range of the test to be displayed in the text display area 20 being changed.

The amount of scrolling the screen differs according to the type of the input received in the Receive Input process. When the knob 34 is dragged, for example, the CPU 11 sets the amount corresponding to the slide amount made by the dragging of the knob 34 as the scroll amount. When the first mark display area 31 or the second mark display area 32 is clicked, the CPU 11 sets the amount corresponding to the vertical length of the knob 34 or the amount corresponding to the number of lines of a text to be displayed in the text display area 20 as the scroll amount. When the arrow 351 or the arrow 352 is clicked, the CPU 11 sets the amount corresponding to one line of a text to be displayed in the text display area 20 as the scroll amount.

After determining the scroll amount, the CPU 11 causes the display unit 16 to display a screen which is the screen displayed in step S13 scrolled by the scroll amount. The screen after scrolling is shown in FIG. 5.

Figure 5:
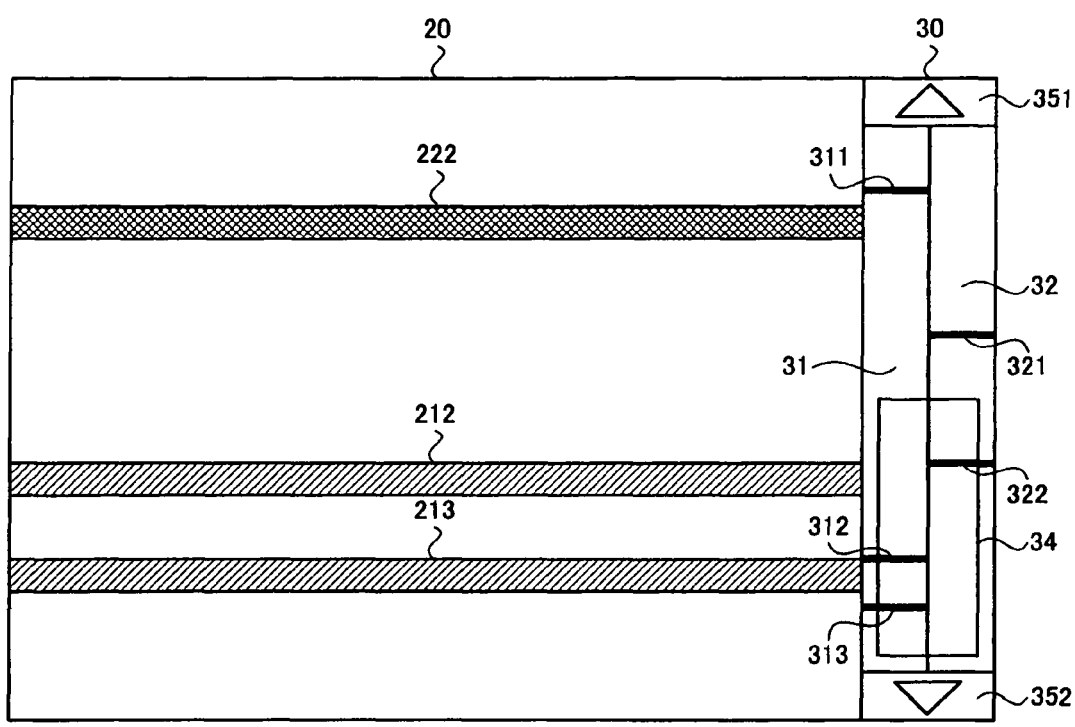
FIG. 5 is a diagram showing a screen after scrolling.

As shown in FIG. 5, the screen after scrolling differs from the screen before scrolling only in the display of the text display area 20 and the display position of the knob 34. When the scroll amount corresponds to ten lines in a text, for example, the CPU 11 displays the eleventh line to twentieth line in the text stored in the storage unit 14 in the text display area 20. Moreover, the CPU 11 highlights the seventeenth line and the nineteenth line in the text display area 20 in a manner corresponding to the mark 1, and highlights the thirteenth line in a manner corresponding to the mark 2.

The CPU 11 displays the knob 34 at a position corresponding to the eleventh to twentieth lines.

After completing the screen scroll (step S17) or the individual process (step S16), the CPU 11 determines whether there is a request to terminate text display (step S18). Specifically, the CPU 11 determines whether a request to terminate text display is received from the user in the Receive Input process of step S14.

When having determined that there is no text display termination request (step S18: NO), the CPU 11 executes the mark affixing process again (step S12). When having determined that there is a text display termination request (step S18: YES), on the other hand, the CPU 11 terminates the text display process.

Figure 2:
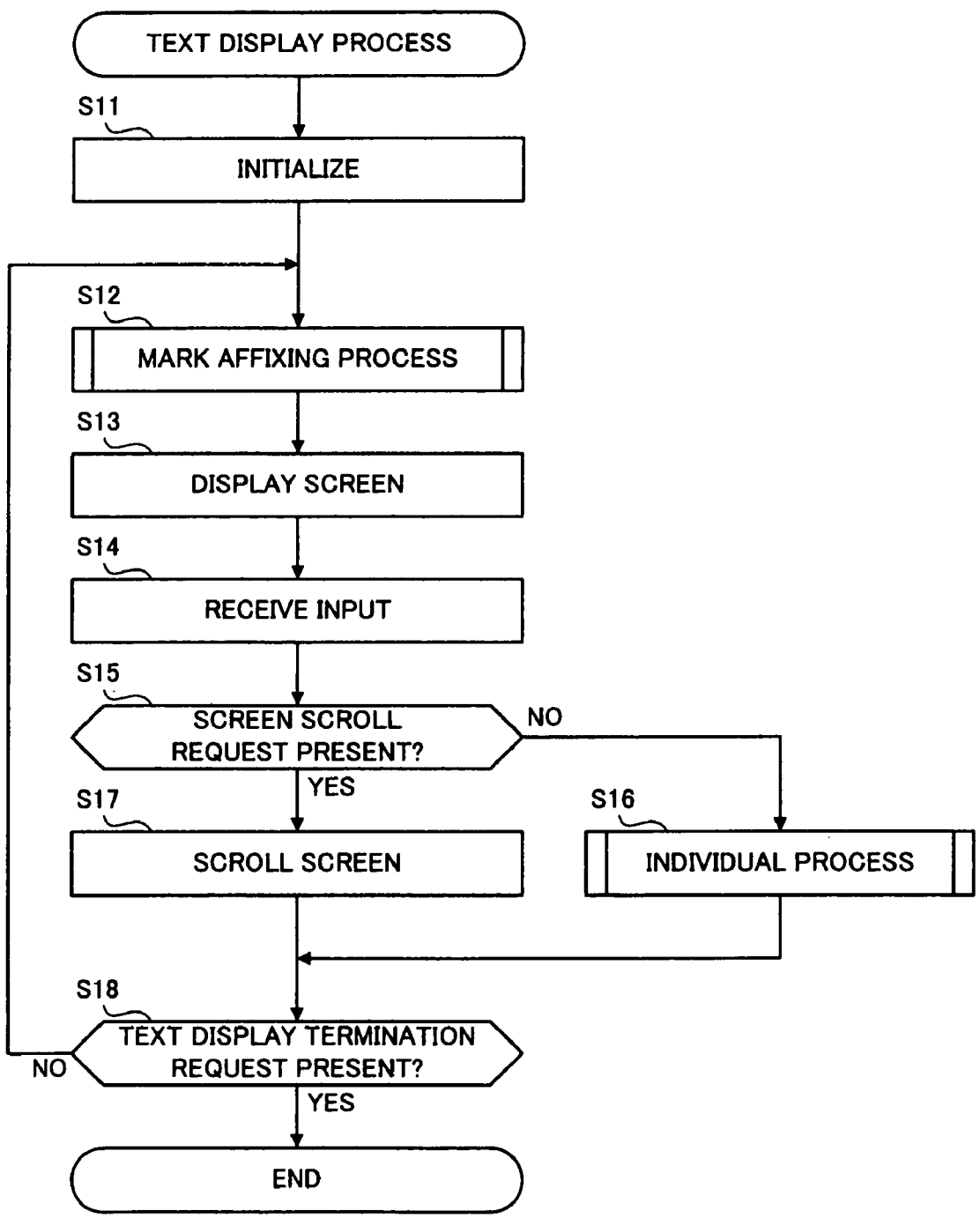
FIG. 2 is a flowchart illustrating a text display process.

Next, a description will be given of a case where the individual process (step S16) shown in the flowchart in FIG. 2 is an operation for searching for a character string.

Figure 6:
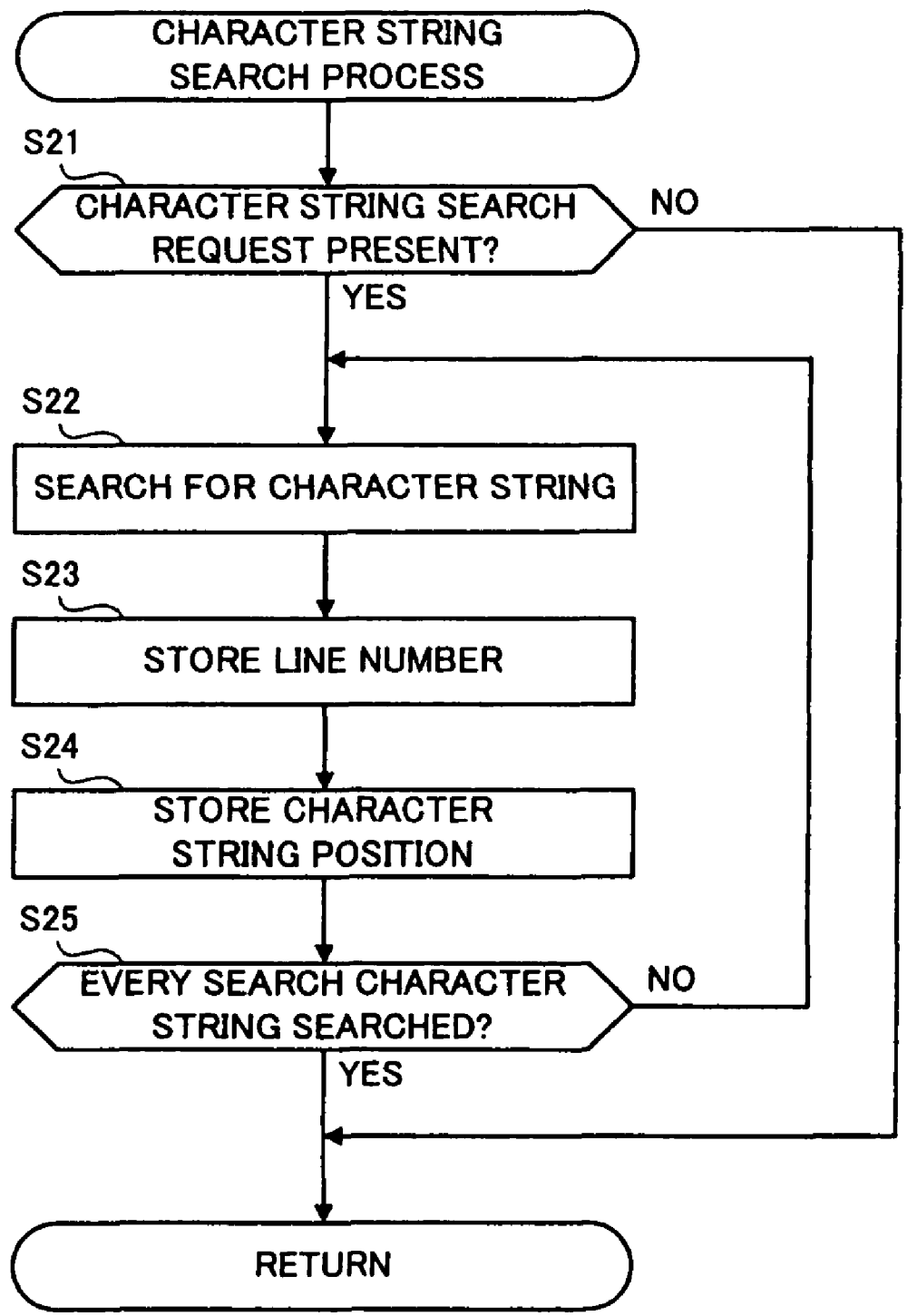
FIG. 6 is a flowchart illustrating a search process for a character string.
Figure 7:
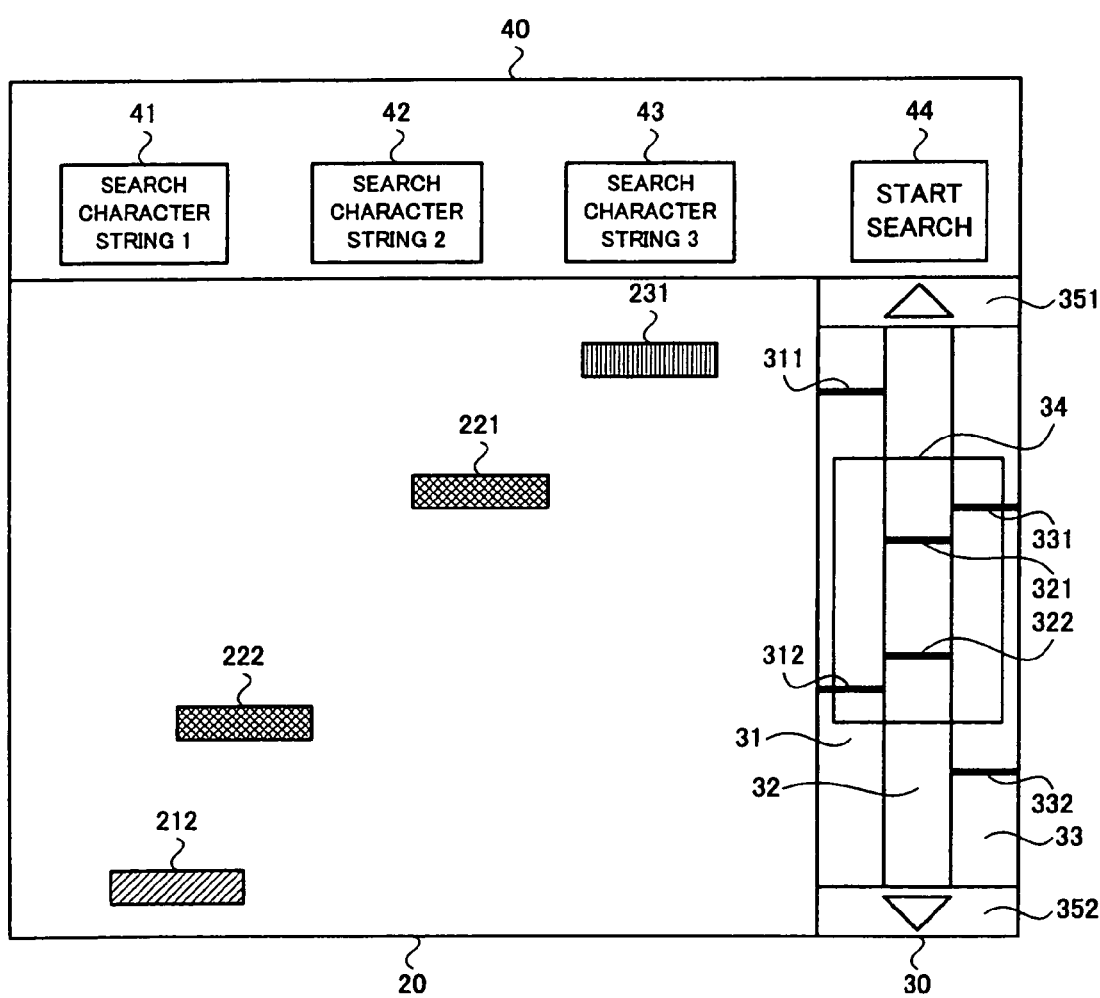
FIG. 7 is a diagram showing a screen for character string search.

FIG. 6 shows a flowchart illustrating a character string search process which is executed by the text display apparatus 10. FIG. 7 shows a screen for character string search which is displayed in the Display Screen process of step S13 at the time of the character string search process.

As shown in FIG. 7, the screen for character string search has a character string search area 40 in addition to the text display area 20 and the scroll bar area 30. The character string search area 40 is an area to display text boxes and a button, and has text boxes 41 to 43 to accept inputs for search character strings, and a search start button 44 to instruct the timing of starting searching for a character string.

The text box 41 receives an input of a first search character string, the text box 42 receives an input of a second search character string, and the text box 43 receives an input of a third search character string. In response to clicking of the search start button 44, the CPU 11 starts searching for an effective search character string among the first search character string, the second search character string and the third search character string.

In the character string search process, first, the CPU 11 determines whether there is a character string search request (step S21). When the CPU 11 determines in the Receive Input process of step S14 shown in FIG. 2 that the user has clicked the search start button 44, the CPU 11 determines that there is a search request for a character string. When having determined that there is a search request for a character string (step S21: YES), the CPU 11 starts searching for the character string (step S22).

The CPU 11 searches the text stored in the storage unit 14 for a single search character string (e.g., the first search character string) (step S22).

The CPU 11 stores the line number of the character string found in the Search For Character String process (step S22) in the storage unit 14 (step S23), and also stores the position of the character string in a line with that line number in the storage unit 14 (step S24).

Next, the CPU 11 determines whether the search for all the search character strings has been completed, i.e., whether the search for all of the first search character string, the second search character string and the third search character string has been completed (step S25).

When having determined that the search for all the search character strings has not been completed (step S25: NO), the CPU 11 executes the search for the next search character string (step S22). When having determined that the search for all the search character strings has been completed (step S25: YES), on the other hand, the CPU 11 terminates the character string search process.

Figure 8:
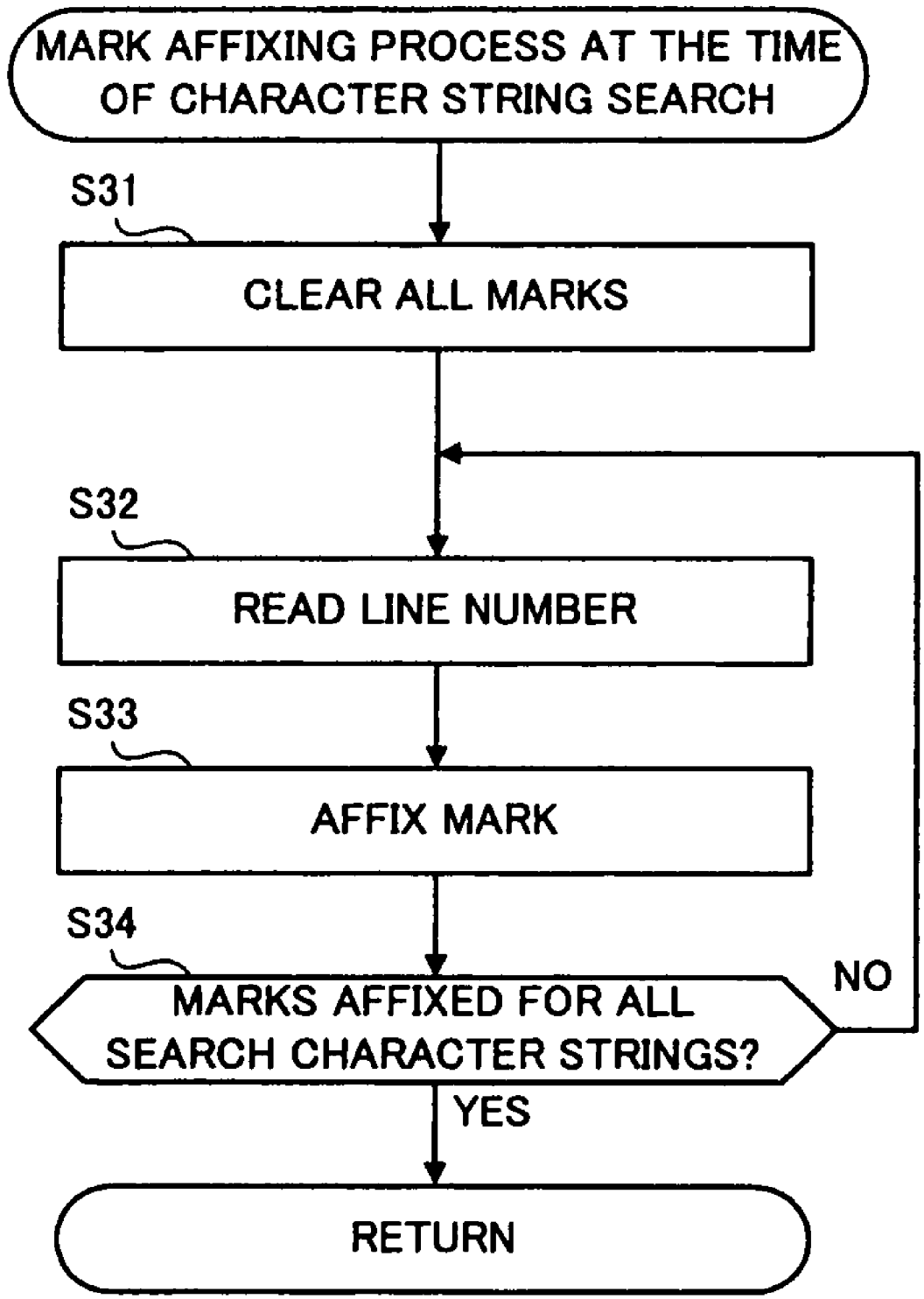
FIG. 8 is a flowchart illustrating a mark affixing process at the time of character string search.

Next, referring to a flowchart shown in FIG. 8, a description will be given of a mark affixing process at the time of character string search (step S12 in FIG. 2).

First, the CPU 11 sets every mark affixing information stored in the storage unit 14 to "0" (step S31). Here, the mark affixing information includes information on a mark indicating if each line contains a first search character string (mark 1), information on a mark indicating if each line contains a second search character string (mark 2), and information on a mark indicating if each line contains a third search character string (mark 3).

Next, the CPU 11 reads that line number in line numbers stored in the storage unit 14 in the Store Line Number process (step S23) shown in FIG. 6 which corresponds to one search character string (e.g., first search character string) (step S32).

The CPU 11 sets mark affixing information in those pieces of mark affixing information stored in the storage unit 14 which corresponds to the line number read in step S32 to "1" (step S33).

Next, the CPU 11 determines whether a mark has been affixed to every search character string, i.e., whether marks have been affixed to all of the first search character string, the second search character string and the third search character string (step S34).

When having determined that a mark has not been affixed to every one of the search character strings (step S34: NO), the CPU 11 returns the process to the Line Number Read (step S32) for affixing a mark to the next search character string. When having determined that a mark has been affixed to every search character string (step S34: YES), the CPU 11 terminates the mark affixing process at the time of character string search.

When mark affixing process at the time of character string search is terminated, the CPU 11 performs displaying screen in the process of step S13 shown in FIG. 2. As shown in FIG. 7, based on the mark affixing information stored in the storage unit 14, the CPU 11 affixes mark figures to the scroll bar area 30 and highlights a character string to be displayed in the text display area 20.

Specifically, for the first search character string, the CPU 11 displays the first mark figures 311 and 312 at positions corresponding to the line numbers of lines for which the mark affixing information is set to "1" and at corresponding positions in the first mark display area 31. Likewise, the CPU 11 displays the second mark figures 321 and 322 at corresponding positions in the second mark display area 32 for the second search character string, and displays third mark figures 331 and 332 at corresponding positions in a third mark display area 33 for the third search character string.

In addition, the CPU 11 highlights a character string matching with the search character string in those character strings to be displayed in the text display area 20 based on the mark affixing process. To allow the user to be able to immediately recognize a character string matching with the search character string, the CPU 11 highlights only the character string matching with the search character string, not entire lines of the character string matching with the search character string.

Specifically, the CPU 11 reads a line number stored in the storage unit 14, and determines whether the read line number is to be displayed in the text display area 20. When having determined that the read line number is to be displayed in the text display area 20, the CPU 11 reads the position of the character string matching with the search character string in that line from the storage unit 14, and highlights an area corresponding to the position of the character string.

FIG. 7 shows an example in which a first highlight display area 212 is highlighted for the first search character string, second highlight display areas 221, 222 are highlighted for the second search character string, and a third highlight display area 231 is highlighted for the third search character string.

Although the highlighting mode is optional, to clearly show with which one of the first search character string, the second search character string and the third search character string the character string matches, the background color of the character string may be set to "red" for the character string matching with the first search character string, may be set to "blue" for the character string matching with the second search character string, and may be set to "yellow" for the character string matching with the third search character string. The color of the mark figure to be displayed in the scroll bar area 30, and the color of the text to be displayed in the text box of the character string search area 40 may be displayed in the colors corresponding to the individual search character strings.

As described above, the text display apparatus 10 according to the embodiment can clearly show which part in a text a character string matching with a search character string is distributed. In addition, the scroll bar area is divided by the number of search character strings and a mark figure corresponding to each search character string is displayed in each of the divided areas, so that distributions for the respective search character strings can be clearly shown at the same time.

The text display apparatus 10 can be adapted to not only the case of showing the result of searching for a character string, but also to a case of, for example, debugging a program in an integrated development environment. The integrated development environment may have a behavioral synthesis tool and a logic synthesis tool, and may generate structural information to be written in an FPGA (Field Programmable Gate Array). The following describes an operation of debugging using the text display apparatus 10. It is assumed that the text display apparatus 10 debugs a program expressed by a text stored in the storage unit 14.

Figure 9:
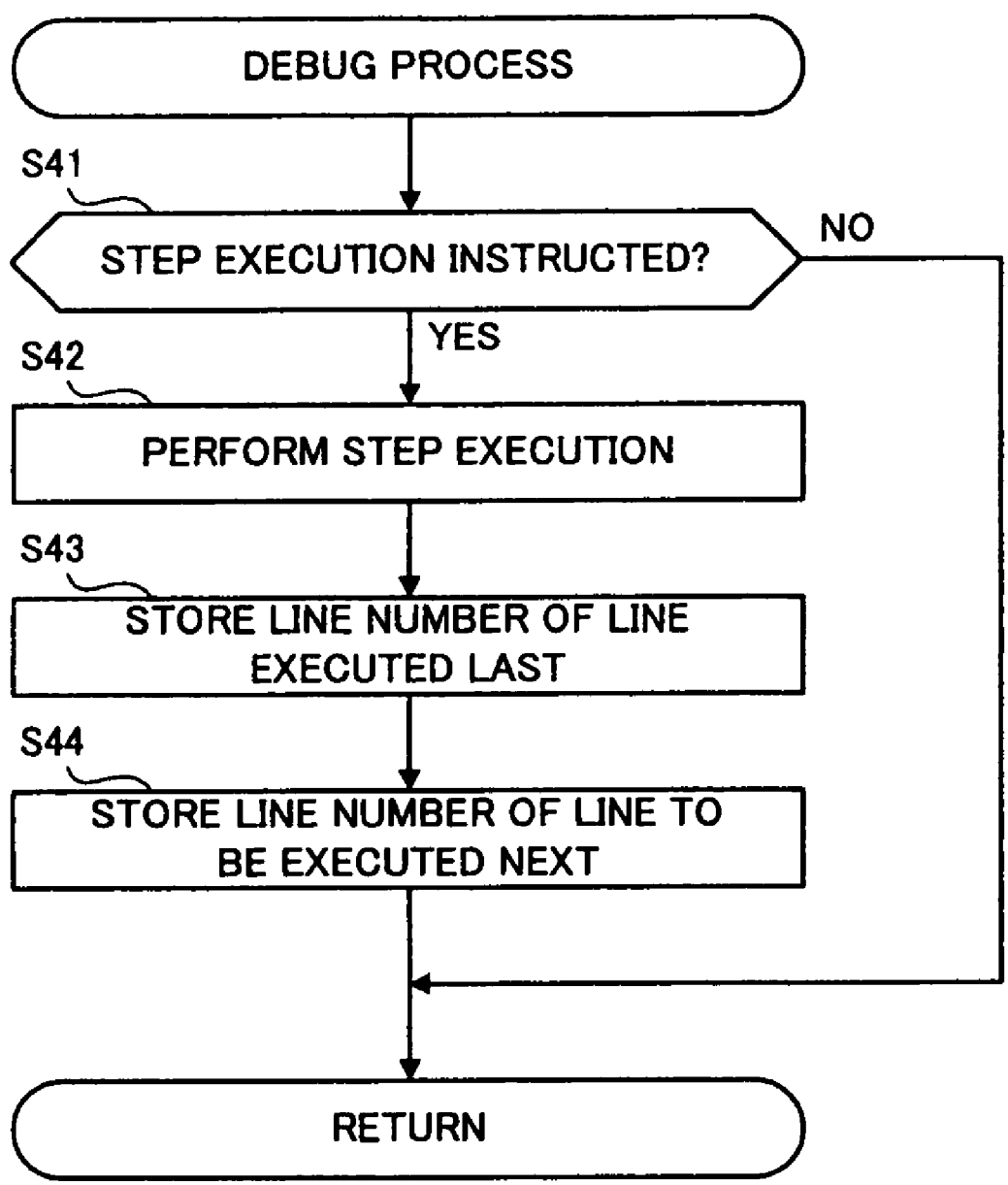
FIG. 9 is a flowchart illustrating a debug process.
Figure 10:
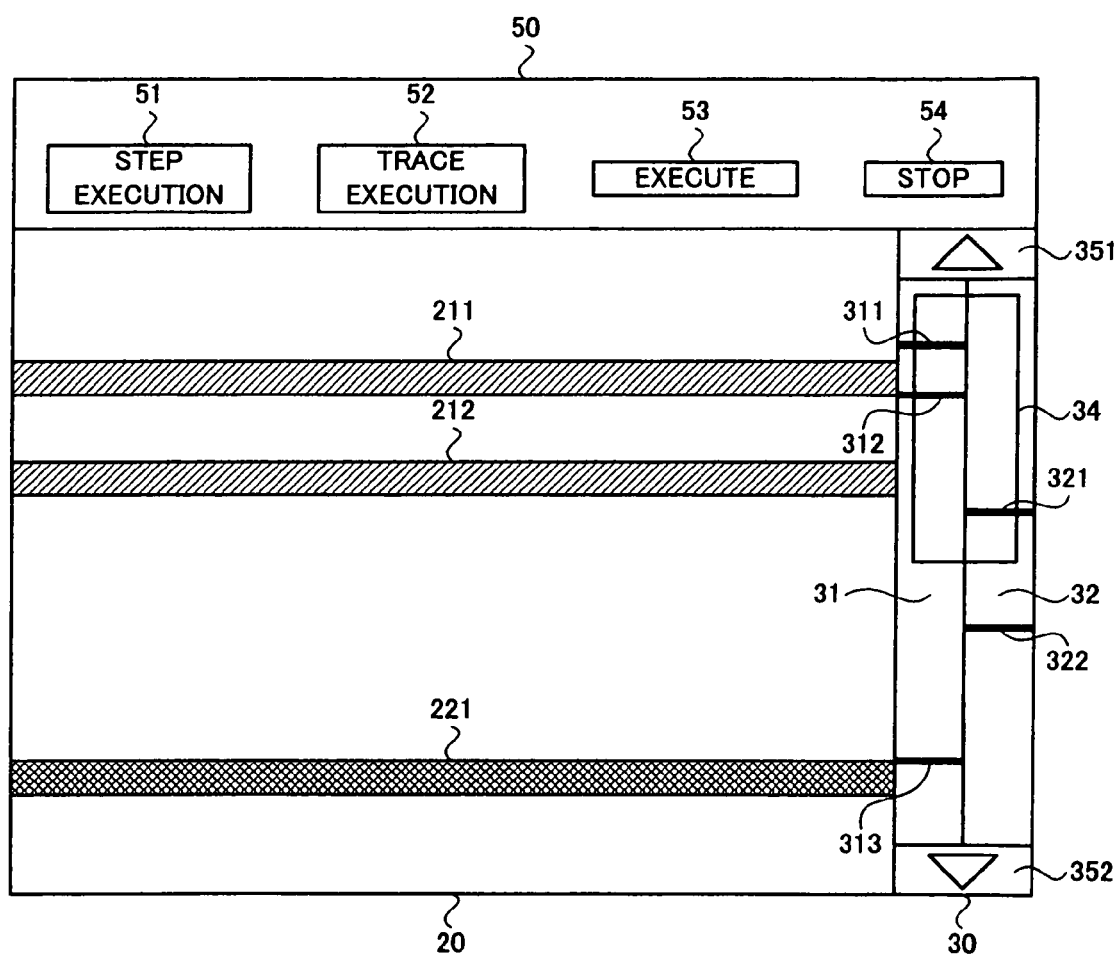
FIG. 10 is a diagram showing a screen for the debug process.

FIG. 9 shows a flowchart for a debug process which is executed by the text display apparatus 10. FIG. 10 shows a debug screen to be displayed in the Display Screen process (step S13) in FIG. 2 when the text display apparatus 10 executes the debug process.

As shown in FIG. 10, the debug screen has a debug area 50 in addition to the text display area 20 and the scroll bar area 30. The debug area 50 is an area to display buttons needed in debugging, and has a step execution button 51 to instruct step execution of a program, a trace execution button 52 to instruct trace execution of the program, an execution button 53 to instruct execution of the program, and a stop button 54 to instruct to stop executing the program.

FIG. 9 shows the flowchart of the debug process when step execution of a program is carried out. Although the description of the debug process in the case of carrying out trace execution of a program or in the case of executing or stopping the program is omitted, similar effects are obtained.

In the debug process, first, the CPU 11 determines whether there is a step execution request (step S41). When the CPU 11 determines in the Receive Input process of step S14 in FIG. 2 that the user has clicked the step execution button 51, the CPU 11 determines that there is a step execution request. When having determined that there is the step execution request (step S41: YES), the CPU 11 carries out step execution of the program.

The CPU 11 carries out step execution of the program that is expressed by a text stored in the storage unit 14 (step S42).

The CPU 11 stores the line number of a line corresponding to the program executed last in the Step Execution (step S42) in the storage unit 14 (step S43), and stores the line number of a line corresponding to a program to be executed next in the storage unit 14 (step S44).

When the process of step S44 is finished, the CPU 11 terminates the debug process.

Figure 11:
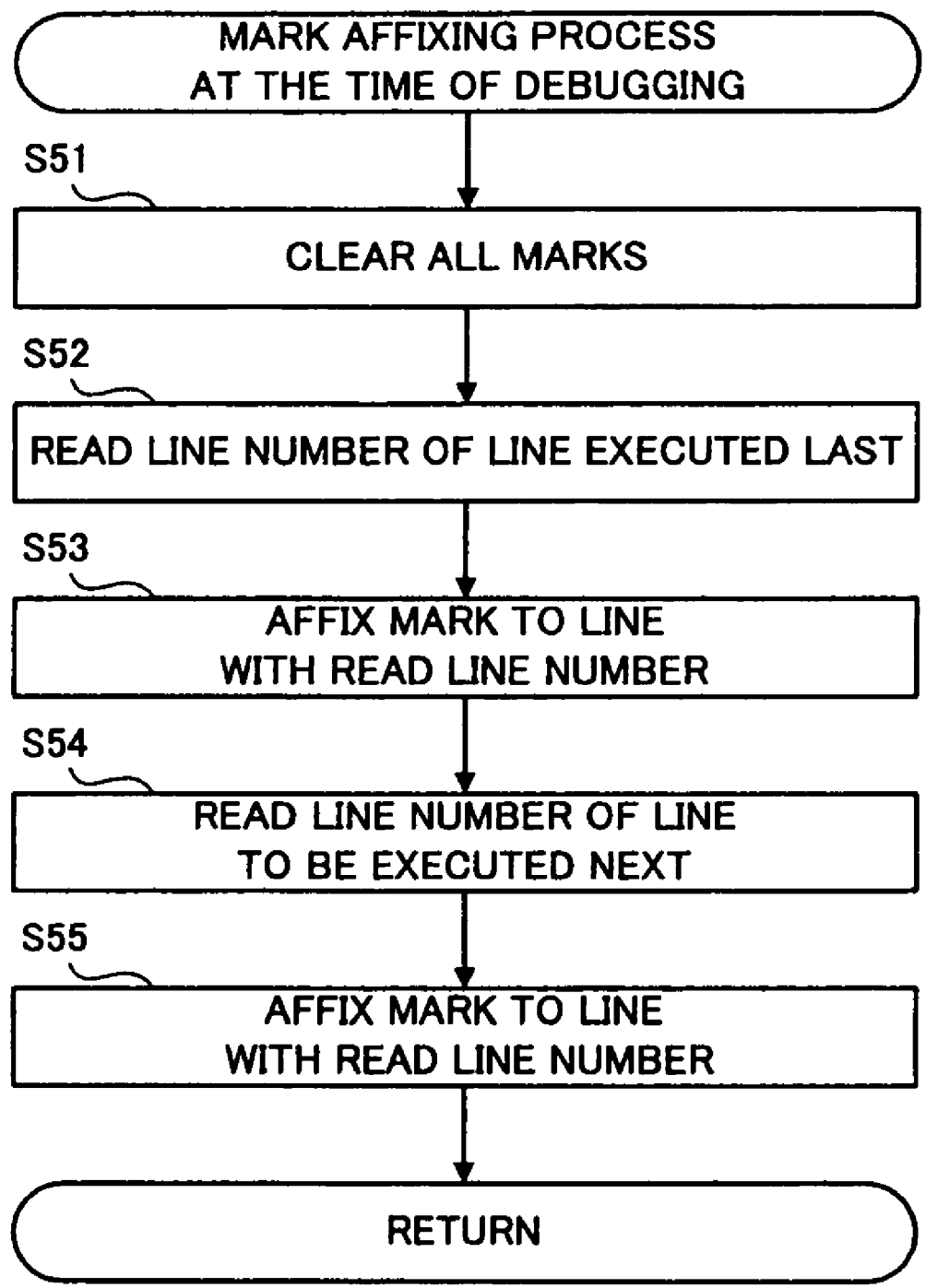
FIG. 11 is a flowchart illustrating a mark affixing process at the time of debugging.

Next, referring to a flowchart shown in FIG. 11, a description will be given of the mark affixing process (step S12 in FIG. 2) in the case where the text display apparatus 10 executes the debug process.

First, the CPU 11 sets every mark affixing information stored in the storage unit 14 to "0" (step S51). Here, the mark affixing information includes information on a mark indicating if each line corresponds to the program executed last (mark 1), and information on a mark indicating if each line corresponds to a program to be executed next (mark 2).

Next, the CPU 11 reads all the line numbers of lines corresponding to the last executed program from the storage unit 14 (step S52).

The CPU 11 sets mark affixing information in those pieces of mark affixing information stored in the storage unit 14 which corresponds to the line numbers of the lines corresponding to the last executed program to "1" (step S53).

Next, the CPU 11 reads all the line numbers of lines corresponding to the program to be executed next from the storage unit 14 (step S54).

The CPU 11 sets mark affixing information in those pieces of mark affixing information stored in the storage unit 14 which corresponds to the line numbers of the lines corresponding to the program to be executed next to "1" (step S55).

After setting the mark affixing information which corresponds to the line numbers corresponding to the program to be executed next to "1", the CPU 11 terminates the mark affixing process at the time of debugging.

Upon termination of the mark affixing process at the time of debugging, the CPU 11 executes displaying screen in the process of step S13 shown in FIG. 2. As shown in FIG. 10, based on the mark affixing information stored in the storage unit 14, the CPU 11 affixes mark figures to the scroll bar area 30 and highlights a specific area in the text display area 20.

Specifically, for the lines corresponding to the program executed last, the CPU 11 displays the first mark figures 311, 312 and 313 at positions corresponding to the line numbers of lines for which the mark affixing information is set to "1" and at corresponding positions in the first mark display area 31. Likewise, the CPU 11 displays the second mark figures 321 and 322 at corresponding positions in the second mark display area 32 for the program to be executed next.

The CPU 11 also highlights a line affixed with the mark information of "1" in the lines to be displayed in the text display area 20.

Specifically, the CPU 11 reads a line number stored in the storage unit 14, and determines whether the read line number indicates a line to be displayed in the text display area 20. When the CPU 11 determines that the read line number indicates the line to be displayed in the text display area 20, the CPU 11 highlights the line.

FIG. 10 shows an example where the first highlight display areas 211, 212 are highlighted for the lines corresponding to the program executed last, and the second highlight display area 221 is highlighted for the line corresponding to the program to be executed next.

Although the highlighting mode is optional, to clearly show which line is a line corresponding to the program executed last and which line is a line corresponding to the program to be executed next, the background of each line may be displayed in such a way that the line corresponding to the program executed last is displayed in "red", and the line corresponding to the program to be executed next is displayed in "blue". The color of a mark figure to be displayed in the scroll bar area 30 may be displayed in the same color as the color to be highlighted in the text display area 20.

As described above, the text display apparatus 10 according to the embodiment can clearly show which part of the text the line corresponding to the program executed last and the line corresponding to the program to be executed next are distributed.

Although the foregoing embodiment has been described on the premise that a program is executed according to a single control flow. However, a program may be a parallel program or a concurrent program which is executed along a plurality of control flows.

In this case, the mode of a mark figure displayed in the scroll bar area 30 is set in such a way that it is possible to distinguish which mark figure corresponds to which control flow.

For example, in the text display area 20 and the scroll bar area 30 shown in FIG. 10, mark figures are displayed in "red" for the line corresponding to a program executed last by the first control flow and the line corresponding to a program to be executed next by the first control flow, and mark figures are displayed in "blue" for the line corresponding to a program executed last by the second control flow and the line corresponding to a program to be executed next by the second control flow. In this case, the scroll bar area is divided into the first mark display area and the second mark display area, so that a user can distinguish whether the mark figure is a mark figure corresponding to a line corresponding to a program to be executed by the first control flow, or the mark figure is a mark figure corresponding to a line corresponding to a program to be executed by the second control flow.

The foregoing description of the embodiment has been given of the example where in the character string search, a search is performed for each of a plurality of search character strings (first search character string, second search character string, and third search character string), and the search results are displayed in the respective mark display areas. However, the present invention is applicable to not only the case where the search result for each of a plurality of search character strings is displayed in the respective mark display area, but also to a case of, for example, search for a single search character string to acquire a character string which completely matches with the search character string and a character string similar to the search character string, the search result for the character string completely matching with the search character string is displayed in the first mark display area, and the search result for the similar character string is displayed in the second mark display area.

Although the foregoing description of the embodiment has been given, by way of example, of the case where the scroll bar area 30 is provided on the right-hand side to the text display area 20 to scroll a text displayed in the text display area 20 up and down, the present invention may be adapted to a case where the scroll bar area 30 is provided above or under the text display area 20 to scroll a text displayed in the text display area 20 leftward or rightward.

The embodiment has been described on the premise that programs are prestored in the storage unit. However, the programs for executing the foregoing processes may be stored in a computer readable recording medium, such as a CD-ROM (Compact Disk Read-Only Memory), DVD (Digital Versatile Disk) or MO (Magneto-Optical Disk), for distribution, and may be installed on another computer so that the computer operates as the above-described units or executes the above-described steps.

Further, the programs may be stored in a disk drive unit or the like equipped in a server apparatus on the Internet, and may be superimposed on, for example, a carrier wave and downloaded into a computer to be executed.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2008-049856 filed on Feb. 29, 2008 and including specification, claims, drawings and summary. The disclosure of the above Japanese Patent Application is incorporated herein by reference in its entirety.

What is claimed is:

1. A text display apparatus comprising:
   an input device;
   a storage unit configured to store a text having a plurality of lines, and information indicating whether one of first to Nth kinds of marks is affixed to each of the plurality of lines;
   a display unit configured to display a text display area displaying a part of the text, and a scroll bar area representing a range of the text from a top line thereof to a last line thereof, and to display in the scroll bar area a knob figure representing a display range of the text in the text display area, and a mark figure at a position corresponding to that line in the plurality of lines forming the text to which the mark is to be affixed;
   a movement instructing input receiving unit configured to receive, by the input device, a movement instructing input to move the knob figure in the scroll bar area; and
   an update unit configured to update the text to be displayed in the text display area to a text of a range corresponding to a moving destination of the knob figure when the knob figure is moved in response to the received movement instructing input, wherein

N≧2 when the plurality of lines forming the text contain a line to which an ith (1≦i≦N) kind of mark is to be affixed, the display unit is configured to highlight the line in the text display area in a manner associated with the ith kind of mark, the scroll bar area is divided into N areas along a direction in which the knob figure is movable, and when the plurality of lines forming the text contain a line to which the mark is to be affixed, the display unit is configured to display a mark figure representing a position of the line in an ith one of the N divided areas.

2. The text display apparatus according to claim 1, wherein when the plurality of lines forming the text contains a line to which an ith (1≦i≦N) kind of mark is to be affixed, the display unit is configured to highlight the line in the text display area in a color associated with the ith kind of mark, and to display a mark figure representing a position of the line in the ith one of the N divided areas in the color associated with the ith kind of mark.

3. The text display apparatus according to claim 1, further comprising:
- a character-string instructing input receiving unit configured to receive a character-string instructing input designating one of first to Nth kinds of search character strings; and
- a mark unit configured to store, when the plurality of lines forming the text contains a line containing an ith (1≦i≦N) kind of search character string designated by the received character-string instructing input, information indicating affixation of an ith kind of mark in the line in the storage unit.

4. The text display apparatus according to claim 1, further comprising:
- an execution unit configured to perform step execution of a program expressed by the text; and
- a mark unit configured to store information indicating affixation of the first kind of mark to a next line to be subjected to the step execution in the storage unit.

5. The text display apparatus according to claim 4, wherein the mark unit is further configured to store information indicating affixation of a second kind of mark to a line which has just undergone the step execution in the storage unit.

6. The text display apparatus according to claim 4, wherein the program to be executed by the execution unit is a parallel program or a concurrent program which is executed along a plurality of control flows, and
the display unit is configured to display the mark figure in a manner associated with that of the plurality of control flows which is to be executed.

7. The text display apparatus according to claim 6, wherein the display unit is configured to display the mark figure in a color associated with that of the plurality of control flows which is to be executed.

8. A text display method to be executed by a text display apparatus having a storage unit, a display unit, a movement instructing input receiving unit, and an update unit comprising:

storing, in the storage unit, a text having a plurality of lines, and information indicating whether one of first to Nth kinds of marks is affixed to each of the plurality of lines;

causing the display unit to display a part of the text in a text display area, display a range of the text from a top line thereof to a last line thereof in a scroll bar area, display a knob figure representing a display range of the text in the text display area, and display a mark figure at a position corresponding to that line in the plurality of lines forming the text to which the mark is to be affixed;

causing the movement instructing input receiving unit to receive a movement instructing input to move the knob figure in the scroll bar area; and causing the update unit to update the text to be displayed in the text display area to a text of a range corresponding to a moving destination of the knob figure when the knob figure is moved in response to the received movement instructing input, wherein

N≧2 when the plurality of lines forming the text contain a line to which an ith (1≦i≦N) kind of mark is to be affixed, the display unit highlights the line in the text display area in a manner associated with the ith kind of mark, the scroll bar area is divided into N areas along a direction in which the knob figure is movable, and when the plurality of lines forming the text contain a line to which the mark is to be affixed, the display unit displays a mark figure representing a position of the line in an ith one of the N divided areas.

9. A non-transitory program storage medium for allowing a computer to function as:
- a storage unit that stores a text having a plurality of lines, and information indicating whether one of first to Nth kinds of marks is affixed to each of the plurality of lines;
- a display unit that has a text display area displaying a part of the text, and a scroll bar area representing a range of the text from a top line thereof to a last line thereof, and displays a knob figure representing a display range of the text in the text display area, and a mark figure at a position corresponding to that line in the plurality of lines forming the text to which the mark is to be affixed;
- a movement instructing input receiving unit that receives a movement instructing input to move the knob figure in the scroll bar area; and
- an update unit that updates the text to be displayed in the text display area to a text of a range corresponding to a moving destination of the knob figure when the knob figure is moved in response to the received movement instructing input, wherein

N≧2 when the plurality of lines forming the text contain a line to which an ith (1≦i≦N) kind of mark is to be affixed, the display unit highlights the line in the text display area in a manner associated with the ith kind of mark, the scroll bar area is divided into N areas along a direction in which the knob figure is movable, and when the plurality of lines forming the text contain a line to which the mark is to be affixed, the display unit displays a mark figure representing a position of the line in an ith one of the N divided areas.

* * * * *